US008870159B2

(12) United States Patent
Rowe et al.

(10) Patent No.: US 8,870,159 B2

(45) Date of Patent: Oct. 28, 2014

(54) AERODYNAMIC CHOPPER FOR GAS FLOW PULSING

(75) Inventors: Bertrand Rowe, Saint Jacut de la Mer (FR); Sebastien Morales, Rennes (FR)

(73) Assignee: Universite Rennes 1, Rennes Cedex (FR)

(*) Notice: Subject to any disclaimer, the term of this patent is extended or adjusted under 35 U.S.C. 154(b) by 68 days.

(21) Appl. No.: 13/386,867

(22) PCT Filed: Jul. 22, 2010

(86) PCT No.: PCT/FR2010/051557

§ 371 (c)(1), (2), (4) Date: Feb. 8, 2012

(87) PCT Pub. No.: WO2011/018571

PCT Pub. Date: Feb. 17, 2011

(65) Prior Publication Data

US 2012/0125463 A1 May 24, 2012

(30) Foreign Application Priority Data

Jul. 24, 2009 (FR) ..................................... 09 03663

(51) Int. Cl.

*F16K 1/16* (2006.01)
*B05B 1/08* (2006.01)
*B05B 1/00* (2006.01)
*B05B 12/06* (2006.01)

(52) U.S. Cl.

CPC ................ *B05B 12/06* (2013.01); *B05B 1/083* (2013.01); *B05B 1/005* (2013.01)

USPC .......................................... 251/301; 251/193

(58) Field of Classification Search

USPC .................................. 251/301, 302, 174, 193

See application file for complete search history.

(56) References Cited

U.S. PATENT DOCUMENTS

| | | | | | |
|---|---|---|---|---|---|
| 917,970 | A | * | 4/1909 | Smith et al. | 251/113 |
| 3,249,117 | A | * | 5/1966 | Edwarde | 137/315.3 |

(Continued)

FOREIGN PATENT DOCUMENTS

| | | | |
|---|---|---|---|
| DE | 33 26 797 | A1 | 2/1985 |
| FR | 2 588 055 | A1 | 4/1987 |
| GB | 781383 | | 8/1957 |

OTHER PUBLICATIONS

International Search Report (PCT/ISA/210) issued on Oct. 12, 2010, by French Patent Office as the International Searching Authority for International Application No. PCT/FR2010/051557.

(Continued)

*Primary Examiner* — Stephen M Hepperle
*Assistant Examiner* — R. K. Arundale
(74) *Attorney, Agent, or Firm* — Buchanan Ingersoll & Rooney PC

(57) ABSTRACT

This supersonic pulse flow device is intended to provide a technical solution in a number of fields where the injection of a flow must be pulsed as required by the process or in order to limit the power consumption and size of the pumping means. In the case of flows achieved by means of a Laval nozzle, it is possible to generate a uniform supersonic jet at very low temperature (currently up to 20 K), which is stable over hydrodynamic periods of time between 150 and 1000 microseconds. This device is aimed as solving problems relating to the use of aerodynamic tools in research and development and in industrial processes.

11 Claims, 3 Drawing Sheets

(56) References Cited

U.S. PATENT DOCUMENTS

| | | | | |
|---|---|---|---|---|
| 3,497,177 | A * | 2/1970 | Hulsey | 251/172 |
| 3,972,507 | A * | 8/1976 | Grove | 251/172 |
| 4,234,525 | A | 11/1980 | Piterskikh et al. | |
| 4,434,967 | A | 3/1984 | Vanderburg | |
| 4,645,179 | A | 2/1987 | Ali | |
| 4,834,288 | A | 5/1989 | Kenny et al. | |
| 5,090,661 | A * | 2/1992 | Parks et al. | 251/172 |
| 5,295,509 | A * | 3/1994 | Suto et al. | 137/625.33 |
| 6,691,981 | B1 * | 2/2004 | Hart | 251/302 |
| 7,093,774 | B2 | 8/2006 | Martin | |
| 8,210,498 | B2 * | 7/2012 | Blanchard et al. | 251/300 |

OTHER PUBLICATIONS

Written Opinion (PCT/ISA/237) issued on Oct. 12, 2010, by French Patent Office as the International Searching Authority for International Application No. PCT/FR2010/051557.

G. Dupeyrat et al., "Design and testing of axisymmetric nozzles for ion-molecule reaction studies between 20°K and 160°K" pp. 1273-1279, 1985, American Institute of Physics.

Ian Smith et al., "Reaction Kinetics at Very Low Temperatures: Laboratory Studies and Interstellar Chemistry" pp. 261-268, Accounts of Chemical Research, May 2000, vol. 33, No. 5.

Aviv Amirav et al., "Absorption Spectroscopy of Ultracold Large Molecules in Planar Supersonic Expansions", pp. 1-4, Chemical Physics Letters, Oct. 1, 1981, vol. 83, No. 1.

A. Amirav et al., "Spectroscopy of the Fluorene Molecule in Planar Supersonic Expansions", pp. 1-6, Chemical Physics 67, 1982, North-Holland Publishing Company.

Yoshiki Okada et al., "Can-driven pulsed Laval nozzle with a large optical path length of 50 cm", pp. 3070-3072, 1996, American Institute of Physics.

Coralie Berteloite et al., Low temperature (39-298 K) kinetics study of the reactions of the $C_4H$ radical with various hydrocarbons observed in Titan's atmosphere, pp. 746-757, 2008, Science Direct.

I.R. Sims, et al., "Ultralow temperature kinetics of neutral-neutral reactions. The technique and results for the reactions $CN+O_2$ down to 13 K and $CN+NH_3$ down to 25K", pp. 4229-4241, 1994, American Institute of Physics.

D. Chastaing et al., Rate coefficients for the reactions of C, atoms with $C_2H_2$, $C_2H_4$, $CH_3C{=}CH$ and $H_2C{=}C{=}CH_2$ at temperatures down to 15K, pp. 241-247, 2001, Astronomy & Astrophysics.

* cited by examiner

AERODYNAMIC CHOPPER FOR GAS FLOW PULSING

This invention relates to a pulse flow device. More particularly, the invention relates to a supersonic flow device. The said invention is intended to provide a technical solution in a number of fields where the flow of gas or liquid must be pulsed as required by the process or in order to limit the power consumption and size of the pumping means. In the case of flows achieved by means of a Laval nozzle, it is possible to generate a uniform supersonic jet at very low temperature (currently up to 20K), which is stable over hydrodynamic periods of time between 150 and 1000 microseconds. This invention is aimed at solving problems relating to the use of aerodynamic tools in research and development and in industrial processes.

The origin of this invention can be found in the development of an experimental device devoted to the study of reaction and collision processes and low-temperature spectroscopy called CRESU[1] [*Cinétique de Réaction en Ecoulement Supersonique Uniforme* (*Reaction Kinetics in Uniform Supersonic Flow*)]. The technique was developed in the mid-1980s by B. R. Rowe and is based on the generation of a continuous uniform supersonic gas flow that constitutes a true ultra-cold wall-less chemical reactor. It involve the use of a Laval nozzle (i.e. an axisymmetric profile made up of a convergent and a divergent part) associated with a large pumping capacity (33,000 $m^3$/hour), which generates, due to isentropic expansion, a uniform supersonic jet that makes it possible to reach very low temperatures while remaining in the gaseous phase. The temperatures accessible are currently located within the 15-300 K range for typical densities up to $10^{16}$ to $10^{17}$ $cm^{-3}$. One essential aspect of the CRESU technique is that it makes it possible to work in conditions of local thermodynamic equilibrium (particularly for rotation and spin-orbit states). It is also the only one that makes it possible to study neutral-neutral reactions at very low temperatures [2].

However, like all processes using supersonic flows, this technique faces major drawbacks derived from the requirement of working with large flow rates, typically about 50 standard liter/min, in order for the isentropic core to remain stable for sufficient length of time. As a result, large pumping capacity is indispensable for maintaining low pressure in the expansion chamber. Such significant pumping leads to high gas consumption, making it difficult to study costly chemical species or those derived from synthesis.

To address that issue, the perspective of pulsing the flow was found to be one of the best solutions. Amirav et al [3] have described a pulsed slit apparatus capable of generating a pulsed planar free jet devoted to spectroscopic studies. A free jet is characterised by the expansion of a gas through a single orifice in a low-pressure environment without being contained by the walls of a nozzle. This type of jet is simple to put in place because it does not require the development of nozzles with sophisticated profiles. Following that work, Kenny and Woundenberg filed patent[4] No. 4,834,288 for apparatus operating with 12-Hz repetition frequency and 120-microsecond pulse duration, based on the rotation of two concentric cylinders pierced with a 0.2 mm wide and 35 mm long slit. This system offers the possibility of being heated to temperature of 200° C. The apparatus was used for absorption and/or LIF (Laser Induced Fluorescence) spectroscopy studies on large-sized organic molecules[5]. The use of supersonic jets for spectroscopy is a very widespread method, because it makes it possible to remove congestion in spectra by easing the different degrees of liberty of molecules. That is because when the molecules are put into movement, thermal energy is transformed into focussed kinetic energy, making the translational temperature drop and narrowing the molecule speed distribution. Thermalisation by the collision of rotational and vibrational states can be observed by the transfer of energy to translation. These transfers of energy are extremely fast and allow the different degrees of freedom, in the first stage of expansion where impacts are numerous, to balance out and lead to the thermalisation of the different states. The great spectral simplification induced in supersonic flows, especially in the case of complex polyatomic molecules, have made them a tool that is very popular with spectroscopists.

Another U.S. Pat. No. 5,295,509, filed by Suto et al [6] describes a pulsed nozzle system that is adapted to the study of reactions at low temperatures and the use of high flow rates without reducing pulsation speeds. This system uses two diaphragms pierced with several slits where two piezoelectric actuators powered by a pulse generator make it possible to move one of the diaphragms. That makes the gas flow or not in the nozzle when the slits are aligned.

Okada and Takeuchi [7] have developed a pulsed planar supersonic jet that uses a camshaft device to pulse the injection of gas in the nozzle reservoir. With a neck thickness of 3 mm and 500 mm length for a minimum pulse time of 25 ms, this type of instrument was used during spectroscopic studies, the planar nature making it possible to increase the optical path and thus the number of absorbent molecules.

The CEA has also designed a type of pulsed system (U.S. Pat. No. 7,093,774 B2) invented by Martin [8] in order to allow the injection of material in a thermonuclear fusion plasma study installation, using the principle of closing by a piston set into motion by compression. Technical data have shown that this system makes it possible to open a valve for a period of 2 ms at an operating frequency of 10 Hz.

The first system aimed at reproducing the CRESU technique in a pulsed version was developed by D. B. Atkinson and M. A Smith [9] and consisted in the periodic filling of the reservoir via commercial pulse valves. Five other test means using this principle were developed internationally (M. Smith, Tucson, USA; S. Leone, University of Berkeley, USA; J. Troe, University of Goettingen, Germany; M. Pilling, University of Leeds, UK or high pressure M. Costes, University of Bordeaux). However, these test means remain limited in temperature and are in general only operational above 50 K.

Since its invention in the 1980s, the CRESU technique and its pulsed versions have made a significant contribution to the area of reactivity in gas phase of extreme environments[10-12]. They have also become remarkable and high-potential aerodynamics tools in a number of areas demanding the use of flows with high gas flows at a high speed. In spite of that, no real full adaptation of the CRESU system has been developed to allow high democratisation of the technique and its transposition to other fields of application.

All the aforementioned inventions share the fundamental difficulty of establishing non-stationary conditions that are strictly identical to those of stationary flows due to the reservoir filling time. Typically, the aforementioned devices do not make it possible to obtain uniform flow with stable nozzle supply pressure and flow rate conditions without excessive consumption of gas; the reservoir needs to be filled regularly, and cannot supply gas to the flow while retaining stable injection conditions in the device.

To reach the nozzle operating conditions (i.e. stable pressure and flow rate conditions that lead to uniform flow) within a reasonable time, currently between 5 and 10 ms, the solution consists in reducing the size of the reservoirs (~1 $cm^3$). Such a solution makes it necessary to prepare the mixtures of gas to inject beforehand, and to store them in a pre-reservoir in limited quantities. Further, the solution induces flow disturbances, because the generating conditions of the reservoir are no longer clearly defined due to strong speed gradients in the small reservoir. The cylinder system of Kenny and Woudenberg [4] has a geometry that is difficult to transpose in most applications.

The device according to the invention is aimed at retaining stable reservoir pressure and flow rate conditions, while producing uniform flow without limiting the size of the reservoir. The device according to the invention is further aimed at not having to prepare and store the mixtures of gas to inject beforehand in pre-reservoirs.

The object of the invention is thus a pulsed flow device comprising continuous injection in the device from a reservoir, means to obstruct the flow, the obstructing means being combined with a dynamic sealing system in a sealed manner around the flow, characterised in that the obstructing means opens and shuts the flow at high frequencies by obstruction.

The device according to the invention is intended to pulse the supersonic flows by a mechanical shutter of the chopper type over a flow section without using pulsed injection in the reservoir, which makes it possible, at a sufficiently high obstructing frequency, to obtain pseudo-stationary operation for all flow adjustments.

The general operating principle consists in pulsing the flow by shutting the passage section of the gas or liquid by means of shutting means, for example a perforated rigid disc rotating at a high speed. In the case of a Laval nozzle, the system is installed on the divergent part, the exact position depending on the geometry of the nozzle. The rotation frequency is such that the reservoir conditions remain unchanged ($P_0$, $T_0$) when the system reaches a pseudo-stationary operating condition. The device makes it possible to significantly reduce the mean rate of flow to inject in the reservoir and thus reduce, in the same proportions, the pumping capacities required for keeping the pressure low in the expansion chamber. Further, the device according to the invention is not subjected to flow disturbances such as those present in the state of the art.

In one alternative of the invention, the obstructing means is a mechanical rotating disc or disc with an alternating movement that makes it possible to open and shut the flow.

Advantageously, in a perfected embodiment, the rotation shaft of the disc does not go through a flow axis, as the disc comprises a hole, and disc rotation alternately brings a full part of the disc and the said hole opposite the flow. The disc further comprises a cut in an edge of the said disc, the said edge being opposite the hole in relation to the centre of the disc.

The hole is preferably oblong in shape in this perfected embodiment.

Advantageously, the dynamic sealing system comprises a main seal, a secondary seal, an upstream ring and a seal compensating chopper movement variations to guarantee conditions of contact between the chopper and the mechanical components profiling the flow.

In one of embodiment, the geometries of the dynamic sealing system and the obstructing means are adapted to Laval nozzles, particularly making it possible to keep the uniformity properties of the flows.

In another embodiment, the geometries of the dynamic sealing system and the obstructing means are adapted to the nozzles with planar and axisymmetric shapes.

In one alternative, the obstructing means is a flat plate with alternating movement.

The object of the invention is also the use of a pulsed gas flow device according to the invention as aerodynamic windows or to protect optical passage elements of the optical window type.

One particular mode of use of the invention involves the use of the device according to the invention to generate flows at very low temperatures.

This invention will now be described with the help of examples that merely illustrate, but are not limitative in any way, the scope of the invention, and with reference to the illustrations enclosed, wherein.

Figure 1:
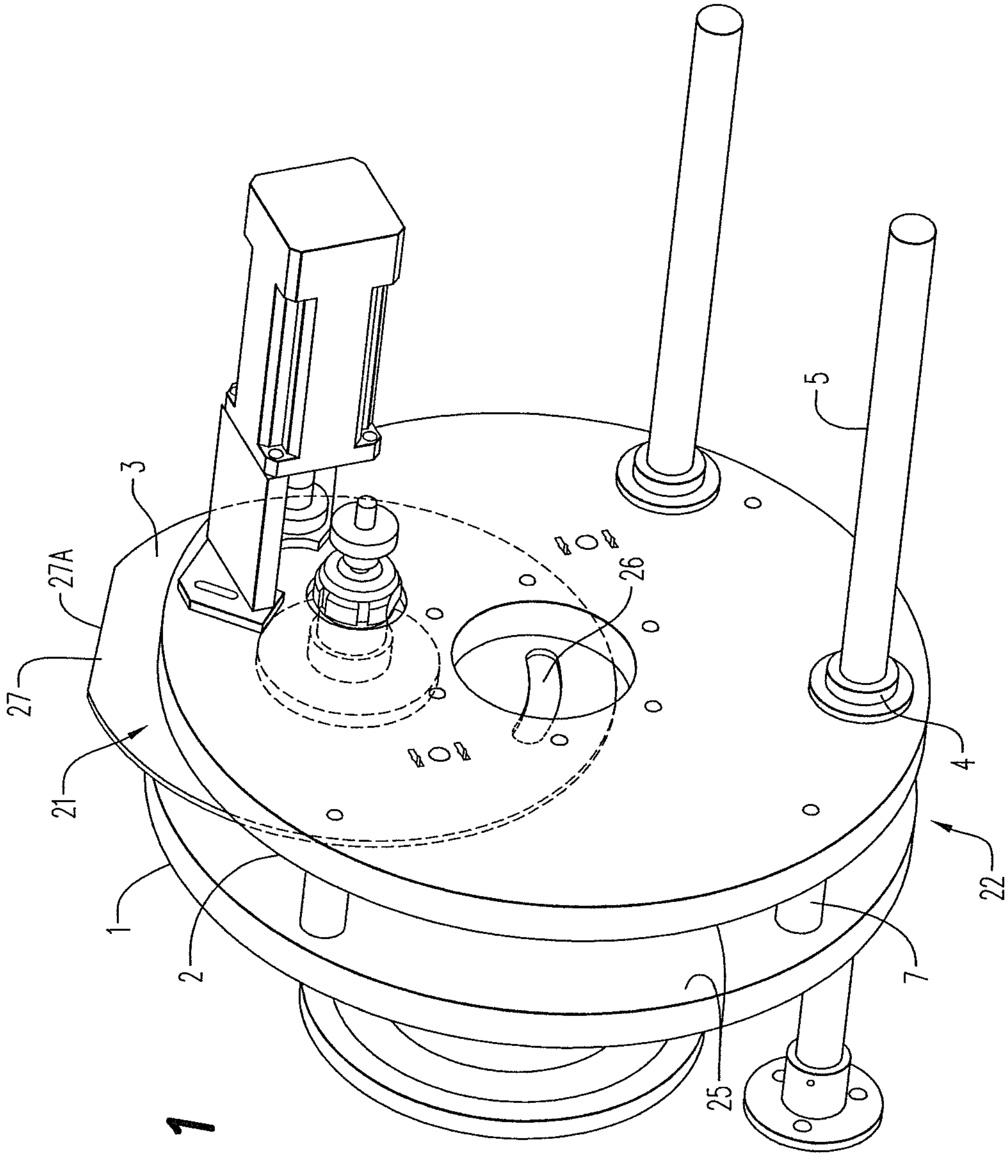
FIG. 1 is a schematic perspective view comprising a see-through part of a device according to the invention.

FIG. 1 is a schematic perspective view comprising a see-through part of a device according to the invention The dimensions stated below are stated as examples and are in no way limitative of the scope of the invention, and may be adapted by those skilled in the art depending on the applications. The example given below is given for a pulsed gas flow, but the invention applies identically to flows of types other than a pulsed gas flow, for instance a liquid flow.

The device comprises a part 22 called the main part 22, a chopping system 21 and a reservoir 23 that is the source of the gas injected in the flow device.

The chopping system 21 is supported by the main part 22 and comprises a chopper 3 or disc or any other obstructing means with an alternating opening.

The said main part 22 is fastened to a reservoir 23, the said reservoir being the source of injection in the device of the flow of gas or any other element that is to be pulsed. That main part 22 is made up of two main rigid supports 1 and 2 that are circular in shape, which, for example have a 340 mm diameter and are 20 mm thick. These supports 1 and 2 are opposite each other. In the case of a Laval nozzle, the respective centres of the main supports 1 and 2 are pierced to receive bases 12 and 19, containing the convergent and divergent profiles of nozzles 13 and 18. A bore 24 with a stop is machined 90 mm away from the centres of the main supports 1 and 2 in order to receive the bearings used for the rotation of the shaft of chopper 3. Two holes are pierced 140 mm away from the centres of main supports 1 and 2, and are designed to receive the bushing bearings 4 in which will be positioned two large shafts 5 mounted on the reservoir 23.

The main part 22 is mounted on the gas reservoir 23 through the two shafts 5. More particularly, the main part 22 is fitted by sliding on these shafts 5 in order to be connected to the reservoir 23. Sliding mounting makes it possible to move the main part 22 along these shafts 5 and to clear the said main part 22 easily from the reservoir 23 and easily change the said main part 22 and/or the nozzle 13 and/or 18 depending on usage needs. On each of the main supports 1 and 2, 85 mm away from the centre of the said main supports 1 and 2, are also located two cavities designed for housing a bearing guiding system 6 of the chopper 3. The guiding system 6 prevents the chopper 3 from deviating when it is rotating. The guiding system 6 is adjusted by means of micrometric screws fastened to the supports 1 and 2, which push the bearing mountings, the return force being provided by springs.

The two supports 1 and 2 are mounted opposite each other with three positioning columns 7 with a 20 mm diameter, the said columns 7 being for instance fitted in the sides 25 of the main supports 1 and 2 respectively, opposite each other. That arrangement makes it possible to keep the two supports 1 and 2 parallel and aligned. The distance between the two supports 1 and 2 is minimised to optimise adjustment accuracy. Lastly, the main support 2 dedicated to the divergent part of the nozzle 18 receives the fasteners of the motor 8 that drives the chopper 3.

The chopper 3 takes the form of a disc 3. The diameter of the chopper 3 is 240 mm, with 1 to 2 mm thickness. An oblong hole 26 with a variable arc length and a 12 mm diameter is arranged 90 mm away from the centre of chopper 3. A cut 27*a* is made on an edge 27 opposite the oblong hole 26 in relation to the centre of the chopper 3. That cut 27*a* makes it possible to balance the disc 3 in spite of the presence of the oblong hole 26. That equilibrium maintenance avoids unbalance and vibrations of the disc 3 at high rotation speeds. It is specified that all the dimensions stated are only provided for guidance and obviously depend on the sizing of the installation and the performance requirements. Typically, the chopper 3 is such that the rotation shaft of the said chopper is parallel to the flow and does not pass through the said flow. The hole 26 of the chopper is located at a distance from the centre equal to the distance separating the centre of the chopper 3 from the gas flow. That distance is indeed adapted to put the hole alternately opposite the flow axis. The cut 27*a* on the edge of the said chopper 3 is made to balance the rotation of the chopper. The cut 27*a* is made opposite the hole in relation to the centre of the chopper 3.

Figure 2:
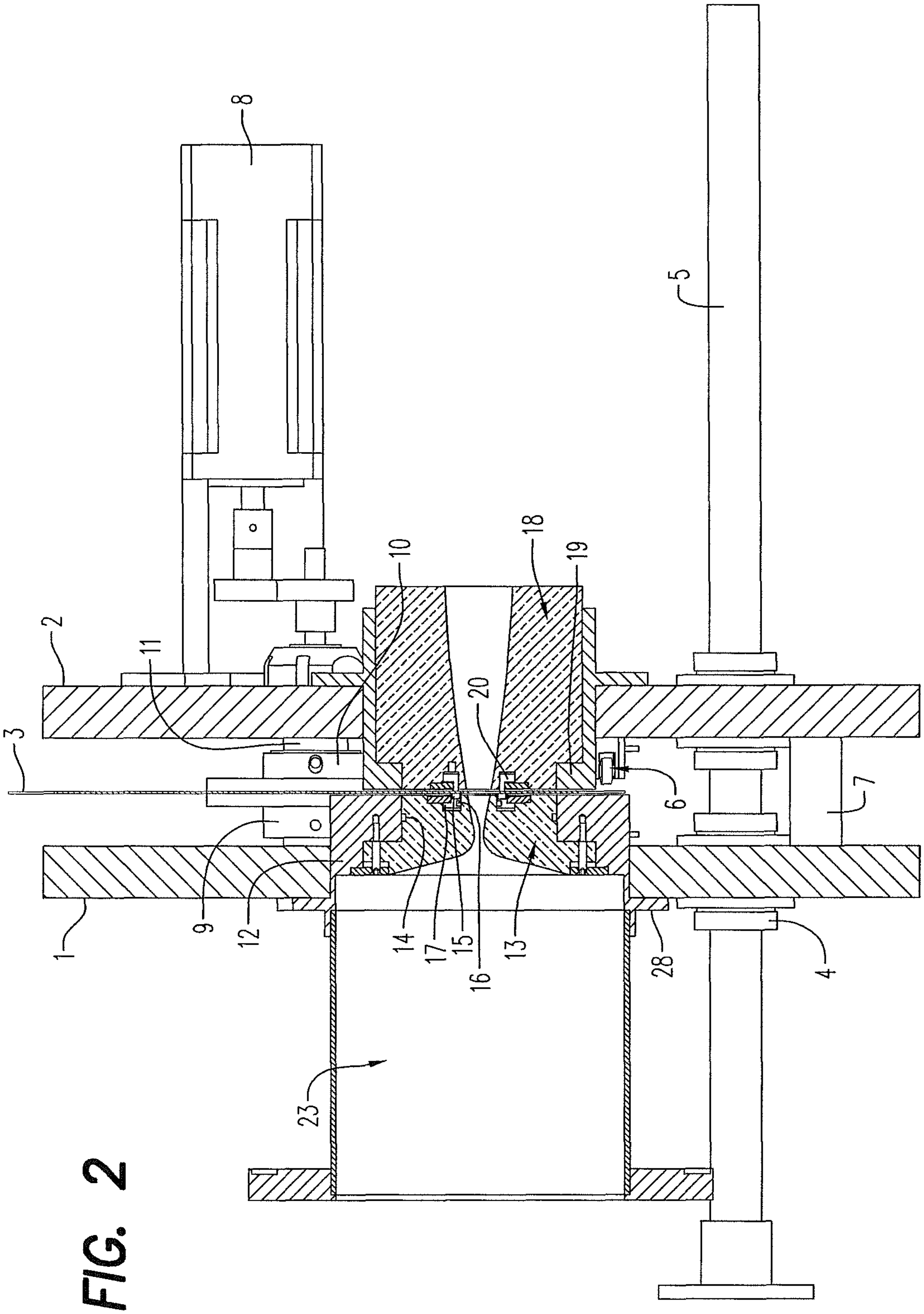
FIG. 2 is a transverse sectional view of a device according to the invention.

FIG. 2 is a transverse sectional view of a device according to the invention.

According to the operating principle restated below, the chopper 3 rotates between the convergent part (12,13) and the divergent part (18,19) of the nozzle. In order to avoid a break in the profile that would destroy the characteristics of the flow, the chopper 3 is preferably fine and perfectly flat. The chopper 3 may be made of one piece, in glass or ceramic material. Another solution is to use a disc 3 made up of a metal part (stainless steel, aluminium etc.) covered with a deposit of pure Teflon® or charged Teflon®, PFA or a composite material with properties offering a compromise between a good friction coefficient and high wear strength. In some cases, the solution of gluing several layers must be used because it makes it possible to bring together the properties of constituents and avoid deformation due to the depositing process.

On the main part 22, the chopper 3 is maintained between two cylindrical fastening pieces 9 and 10. The two fastening pieces 9 and 10 are bored at the centre. A transmission shaft 11 cooperating with the chopper 3 is inserted in these bores 9 and 10. The bores 9 and 10 and shaft 11 are finely adjusted to allow the displacement with little play of the entire chopper 3 and to allow positioning between the convergent (12,13) and the divergent (18,19) part of the nozzle, and to make it easy to remove the chopping system 21.

A first element, named convergent base 12, has fastening claws 28. These fastening claws 28 cooperate with the reservoir 23 to allow the mounting of the main part 22 on the reservoir 23. The convergent base 12 comprises a housing that is complementary with the upstream part 13 of the nozzle, the said housing is capable of receiving the said upstream part 13 of the nozzle. That mechanism is useful when the nozzle is changed, because it makes it easier to replace a profile without dismantling the entire system. The convergent base 12 is inserted in the main support 1 through the central bore and is screwed there. In that base 12, the nozzle 13 is positioned; under the effect of the upstream pressure and the compression springs, it stops against the convergent base 12 making the sealed connection between the reservoir 22 and the expansion chamber thanks to one or two seals 14 on the smaller diameter of the upstream part of the nozzle 13.

The core of the sealing system of the device is embedded in the upstream part of the nozzle 13. Such a sealing system may be as described below or of any other type known to those skilled in the art. The sealing system makes it possible to seal the device in spite of the presence of the chopper 3 and thus makes sure that the pressure and flow rate conditions are not disturbed by a lack of sealing. The basic principle used to ensure effective sealing relies on seals 15, 16 and 20 in dynamic operation with friction, i.e. in contact with the rotating chopper 3, while providing effective sealing.

The technical solution consists in using mobile seals 15, 16 and 20 that are set against disc 3. To that end, on the upstream part of nozzle 13, as close to the profile as possible, a cavity is made to receive a bronze ring 17 on which the main seal 15 will be mounted. The ring 17 bears the main chopper seal 15 in contact with the disc 3. Thus, to reduce indirect leaks from the inside of the housing of ring 17, the secondary chopper seal 16 is added to the inner shaft. The contact force, which determines the sealing and the braking moment applied to disc 3, is adjusted by a set of springs with differing rigidities.

Sealing is provided in the divergent part of the nozzle in a manner that is fairly similar to that described above: it integrates the divergent part of the nozzle 18 and its base 19 for fastening on the main support 2, according to the same principle as above. In that case, the nozzle 18 is not mobile; it is merely fastened to be set against the divergent base 19 by means of screwing. In this part that is downstream from the disc, there is no need for sealing. However, in the closed position, the pressure difference between the reservoir and the chamber leads to the application of force on the chopper, which could thus be warped. The same type of mobile seal 20 as on the upstream part of the nozzle is thus used.

Further, the installation on the edge of the main support 2 opposite the chopper 3 of a piece designed to receive an optical fork made up of an infrared emitter and receiver must be noted. An orifice is made in the chopper 3 opposite the opto-electronic sensor in a position corresponding to the start of the opening of the nozzle. During operation, the signal received is used to calculate the rotation speed of the disc 3. In general, the signal is used as a control to drive any other type of system that is synchronised with the aerodynamic chopper, such as the triggering of laser firing.

During operation, the reservoir 23 contains gas under pressure at a certain temperature. That reservoir 23 supplies gas to the main part 22 and particularly the upstream nozzle 13 with a certain flow. The chopper 3 is subject to rotation at a high frequency. Such high-frequency rotation of the chopper 3 alternately clears and obstructs the flow, at the said high frequency, depending on whether the oblong hole 26 is or is not respectively opposite the flow. That high-frequency obstruction of the flow by the chopper 3, for example over a frequency range of 10 to 100 Hz, makes it possible to obtain pulsed flow while retaining the pressure and temperature conditions of the reservoir 23, because the reservoir 23 does not have to be small in size or be filled during use. The examples below give examples of operating measurements and values or those that can be achieved by the device according to the invention.

The first tests were conducted using the profile of a Laval nozzle operating in continuous mode with the following characteristics: mean flow temperature of 24K over a uniformity distance of 33 cm (196 μs), instant flow rate of 100 standard liters/min, reservoir pressure of 336 mbar and chamber pressure of 0.63 mbar. Tests carried out with the aerodynamic chopper have made it possible to generate a pulsed flow, stable over a distance of 45 cm (266 μs) at a temperature of 22K, at a pulse frequency up to 20 Hz for pulses with a duration of 8 ms. It can be observed that the changeover to the pulsed mode (disc rotating at 10 Hz) has made it possible to reduce the gas flow by a factor of 8 (from 100 $S.I.m^{-1}$ in continuous mode to 12 $S.I.m^{-1}$ in pulsed mode). It is now possible to operate the nozzle with pumping capacity of ~1300 $m^3$/h, when ~10,400 $m^3$/h was required with continuous CRESU.

Figure 3:
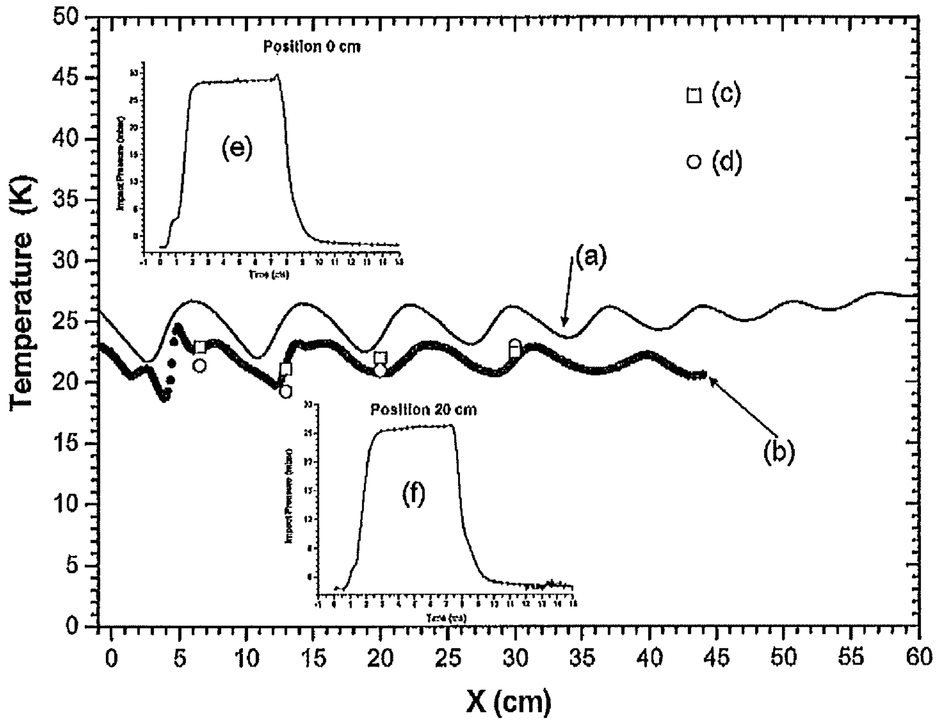
FIG. 3 is a comparison between the different techniques used to characterise, as regards temperature, the pulsed jet achieved by means of the aerodynamic chopper.

FIG. 3 is a comparison between different techniques used to characterise, as regards temperature, the pulsed jet achieved by means of the device according to the invention:

(In FIG. 3, the zero of the X axis is the outlet of the Laval nozzle)

Curve (a) illustrates the results of a numerical simulation of the time resolution type of 2D Navier Stokes equations for this nozzle profile.

Curve (b) shows the results of the measurement of impact pressure in Pitot tubes at different positions in the axis of the nozzle. The particularities of these Pitot measurements come from the fact that each point on the impact pressure curve is obtained by taking a mean value of the maximum on the plateau of curves representing the impact pressure pulse as a function of time, identical to that of FIGS. (e) and (f).

Points (c) represent the measurements of rotational temperature obtained by spectroscopy of the CN radical (study of the population distribution of the R branch of the spectrum) depending on the position of the nozzle.

Points (d) represent the measurements of rotational temperature obtained by spectroscopy of the CN radical (study of the population distribution of the P branch of the spectrum) depending on the position of the nozzle.

Graphs (e) and (f) show impact pressure pulses at different positions (the time in milliseconds is represented on the X axis).

Figure 4:
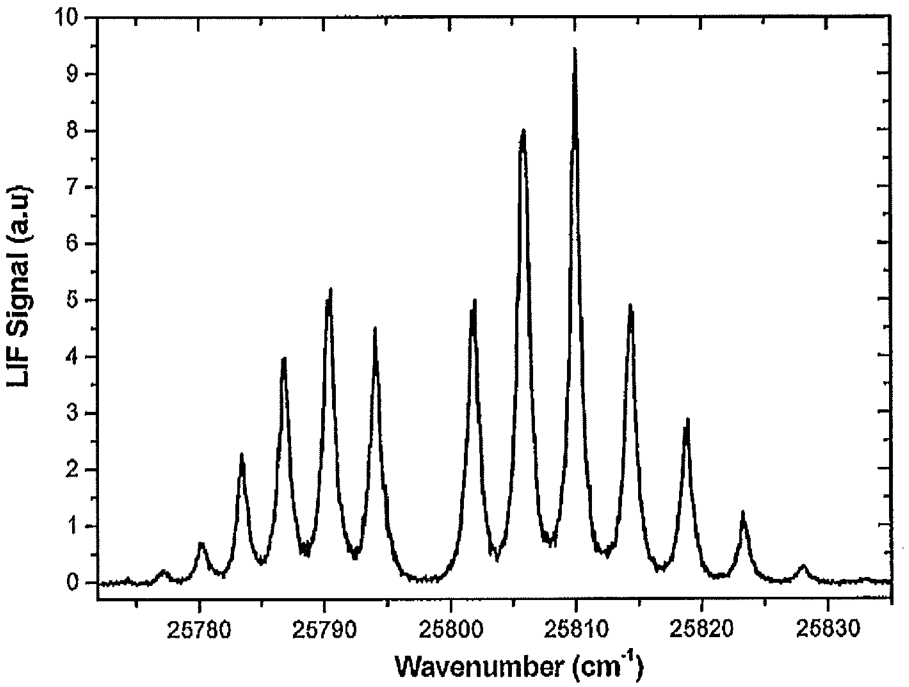
FIG. 4 shows a rovibronic spectrum of the CN radical obtained by LIF (Laser Induced Fluorescence), used to determine the rotational temperature of the flow.

FIG. 4 shows a rovibronic spectrum of the CN radical obtained by LIF (Laser Induced Fluorescence), used to determine the rotational temperature of the flow.

The results indicated demonstrate excellent agreement between the jet obtained in pulsed mode from the aerodynamic chopper compared to that from a conventional CRESU flow.

The quality of the flows obtained with this device is excellent, because it is well-established over times ranging from hundreds of microseconds to the millisecond. It may even be superior to the stationary case through the reduction of turbulence in the reservoir. Different modifications may be made to the aerodynamic chopper in order to adapt it to a geometry that is different from that of a Laval nozzle or the need to reduce the size of the system. The description given makes up the basis of the technical solution and is a non-limitative example in respect of the system dimensions and the materials used.

The invention is an independent and compact piece of equipment that is fastened on the reservoir of an overall installation, which makes it easy to transport and adapt.

REFERENCES

[1] Dupeyrat, G., J. B. Marquette, and B. R. Rowe, *Design and testing of axisymmetric nozzles for ion molecule reaction studies between* 20 *K and* 160 *K*. The Physics of fluids, 1985. 28: p. 1273-1279.

[2] Smith, I. W. M. and B. R. Rowe, *Reaction kinetics at very low temperatures: Laboratory studies and interstellar chemistry*. Acc. Chem. Res., 2000. 33(5): p. 261-268.

[3] Amirav, A., U. Even, and J. Jortner, *Absorption-Spectroscopy of Ultracold Large Molecules in Planar Supersonic Expansions*. Chemical Physics Letters, 1981. 83(1): p. 1-4.

[4] J. E. KENNY, T. W., PULSED SLIT NOZZLE FOR GENERATION OF PLANAR SUPERSONIC JETS. US patent, 1989. U.S. Pat. No. 4,834,288.

[5] Amirav, A., U. Even, and J. Jortner, *Spectroscopy of the Fluorene Molecule in Planar Supersonic Expansions*. Chemical Physics, 1982. 67(1): p. 1-6.

[6] SUTO, PULSE NOZZLE. US patent, 1994. U.S. Pat. No. 5,295,509

[7] Okada, Y., et al., *Cam-driven pulsed Laval nozzle with a large optical path length of* 50 *cm*. Review of Scientific Instruments, 1996. 67(9): p. 3070-3072.

[8] MARTIN, G., DEVICE FOR INJECTING A PULSED SUPERSONIC GAS STREAM. US patent, 2006. U.S. Pat. No. 7,093,774 B2.

[9] Atkinson, D. B. and M. A. Smith, *Design and Characterization of Pulsed Uniform Supersonic Expansions for Chemical Applications*. Review of Scientific Instruments, 1995. 66(9): p. 4434-4446.

[10] Berteloite, C., et al., *Low temperature* (39K-298 K) kinetics study of the reactions of C4H radical with various hydrocarbons observed in Titan's atmosphere. *Icarus,* 194, (2), 746-757. (2008). Icarus, 2008. 194(2): p. 746-757.

[11] Sims, I. R., et al., *Ultra-low temperature kinetics of neutral-neutral reactions: The technique, and results for the reactions* $CN+O_2$ *down to* 13 *K and* $CN+NH_3$ *down to* 25 *K*. J. Chem. Phys, 1994. 100(6): p. 4229-4241.

[12] Chastaing, D., et al., *Rate coefficients for the reactions of C(P-3(J)) atoms with C2H2, C2H4, CH3C≡CH and H2C═C═CH2 at temperatures down to* 15 *K*. Astron. Astrophys., 2001. 365(2): p. 241-247.

The invention claimed is:

1. A pulsed flow device comprising: —a continuous injection of gas in the device from a reservoir, —a flow obstructing means, —the obstructing means being combined with a dynamic sealing system in a sealed manner around the flow path, wherein the obstructing means is a chopper taking the form of a rotating disc or disc with an alternating movement to open and shut the flow, said chopper being associated with a rotation shaft, and wherein the rotation shaft of the disc does not go through a flow axis; and wherein the obstructing means opens and shuts the flow path by obstruction at frequencies such that the reservoir conditions remain unchanged when the system reaches pseudo-stationary operating conditions, wherein the dynamic sealing system comprises: a main seal, a secondary seal, and an upstream ring and a seal compensating chopper movement variations.

2. A pulsed flow device according to claim 1, wherein the disc comprises:

a hole located on the disc at a distance from the centre of the disc equal to the distance separating the centre of the disc from the flow axis, and a cut in an edge of said disc, said edge being opposite the hole in relation to the centre of the disc.

3. A pulsed flow device according to claim 2, wherein the hole is oblong in shape.

4. A pulsed flow device according to claim 2, wherein the geometries of the dynamic sealing system and the obstructing means are adapted to Laval nozzles.

5. A pulsed flow device according to claim 2, wherein the geometries of the dynamic sealing system and the obstructing means are adapted to the nozzles with planar and axisymmetric shapes.

6. Use of a pulsed flow device according to claim 2 to protect optical windows.

7. Use of a pulsed flow device according to claim 2 to generate flows at very low temperatures.

8. A pulsed flow device according to claim 1, wherein the geometries of the dynamic sealing system and the obstructing means are adapted to Laval nozzles.

9. A pulsed flow device according to claim 1, wherein the geometries of the dynamic sealing system and the obstructing means are adapted to the nozzles with planar and axisymmetric shapes.

10. Use of a pulsed flow device according to claim 1 to protect optical windows.

11. Use of a pulsed flow device according to claim 1 to generate flows at very low temperatures.

* * * * *